July 4, 1961
R. P. SAAR
2,991,043
RESILIENT VALVE SEAT LINER
Filed Oct. 7, 1955
2 Sheets-Sheet 1
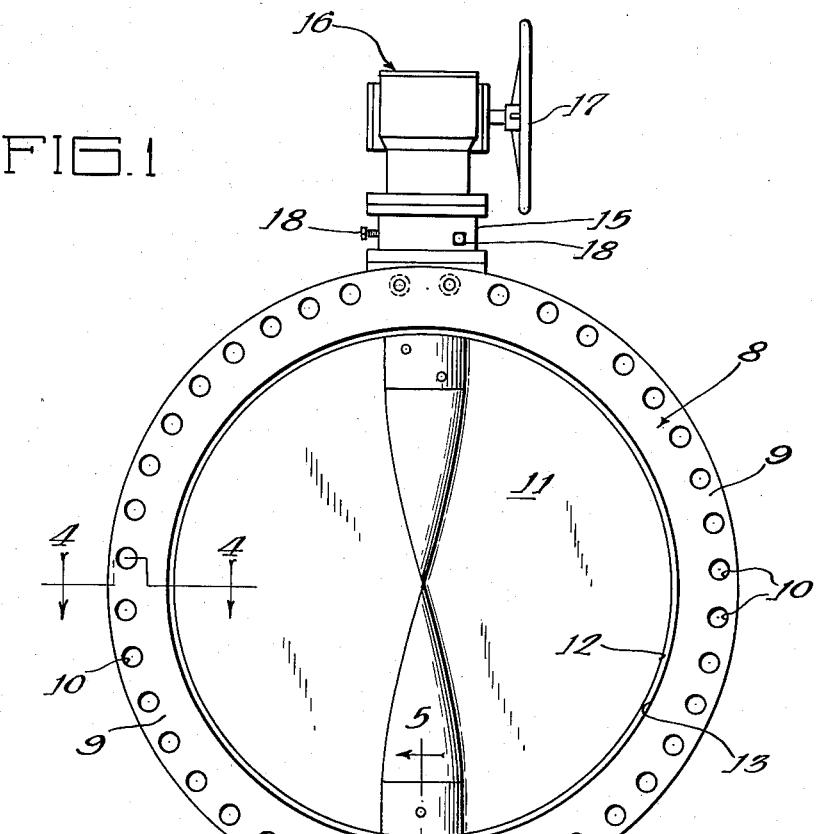
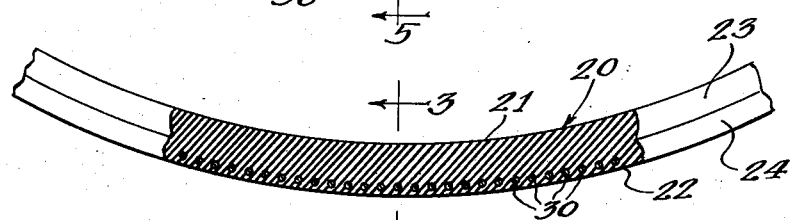
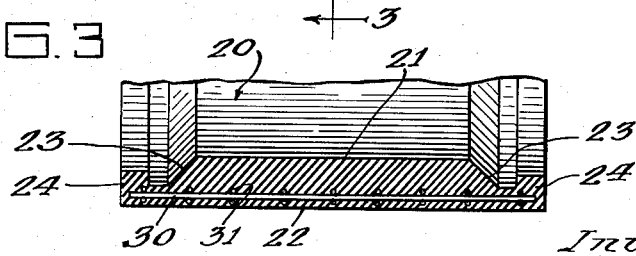
Inventor:
Robert P. Saar
By: Schroeder, Hofgren,
Brady & Wegner
Attorneys July 4, 1961 R. P. SAAR 2,991,043
RESILIENT VALVE SEAT LINER
Filed Oct. 7, 1955 2 Sheets-Sheet 2
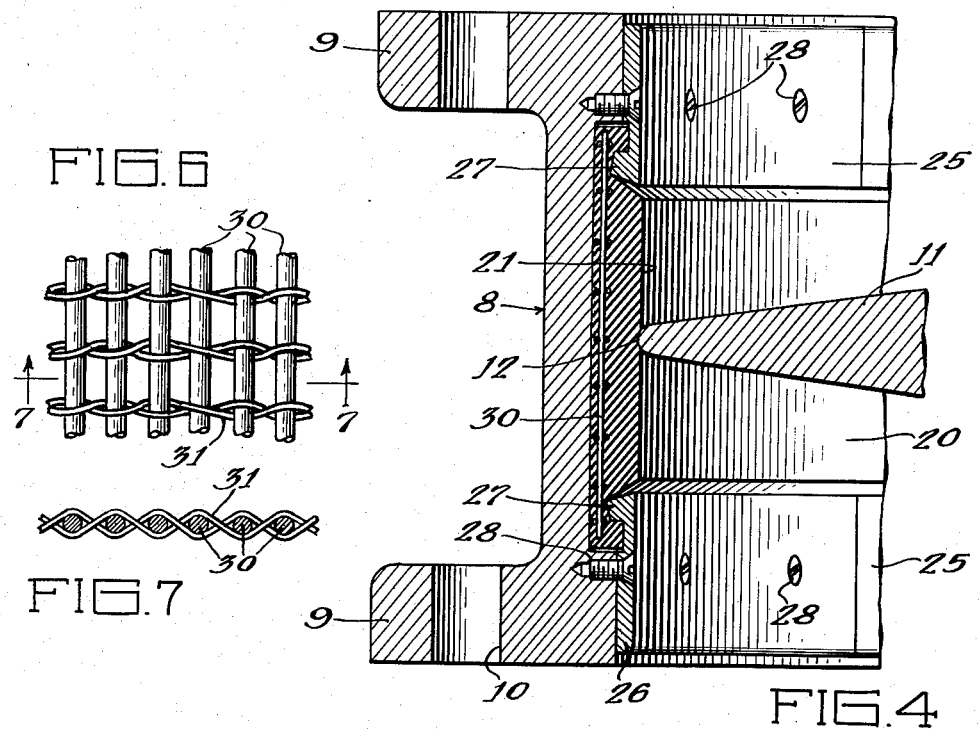
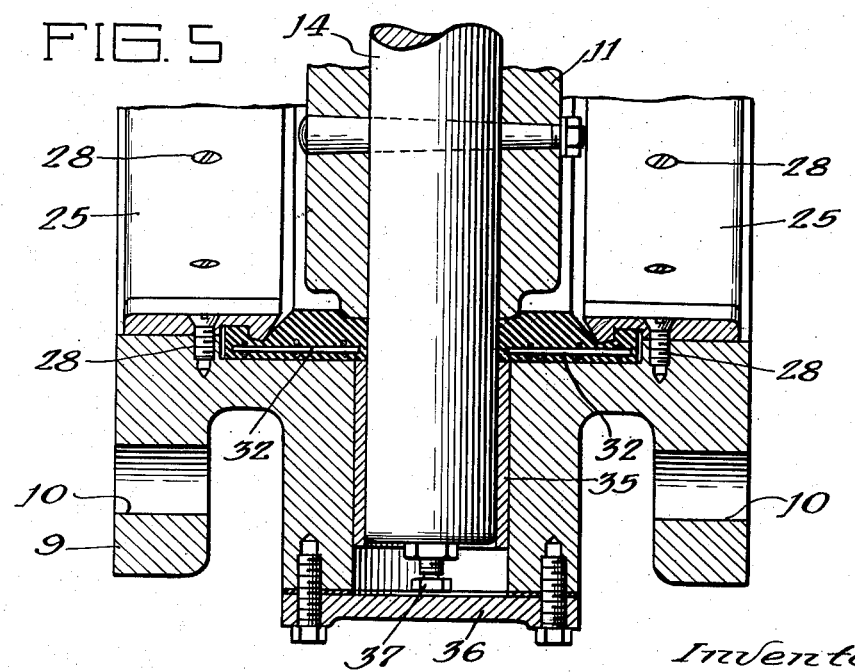
Inventor:
Robert P. Saar
By: Schroder, Hofgren,
Brady & Wegner
Attorneys United States Patent Office 2,991,043
Patented July 4, 1961

2,991,043
RESILIENT VALVE SEAT LINER
Robert P. Saar, Chicago, Ill., assignor to Henry Pratt Company, a corporation of Illinois
Filed Oct. 7, 1955, Ser. No. 539,043
9 Claims. (Cl. 251—306)

This invention relates to resilient seats for valves and more particularly to a metal reinforced resilient seat liner for a valve.

The use of rubber seat liners in valves of the butterfly type has proven satisfactory in obtaining a tight seal when the valve is in closed position and in reducing the necessity of rigidly accurate machining requirements on the valve parts. In the constructions used in the past, the resilient seat liner is generally wider than the valve disc so that portions of the liner were subject to the pressure on the upstream side of the disc. The bonding of the seat liner to the metal valve body or casing has not been sufficiently tight and failed to prevent some pressure application between the liner and valve body. Any pressure exerted behind the liner on the downstream side of the disc has caused the liner to bulge radially inwardly around the disc practically preventing the valve from thereafter being opened. As a result of this deficiency, the shutoff pressures of such valves has been limited to low values and the use of the valves similarly limited.

The present invention provides a reinforced resilient valve seat liner permitting valve shutoff pressures at much higher values than heretofore possible. All of the previous qualities of such valves as to the machining costs and accuracy of valve part fittings has been retained. The new structure will permit a valve previously limited to a low pressure application to be used in either high or low pressure work.

It is the primary object of this invention to provide a new and improved resilient seat liner for valves.

Another object is to provide a resilient seat liner for valves having reinforcing structure for retaining the liner in proper position within the valve housing or casing against distortion under pressure.

A further object is to provide a resilient liner for a valve permitting the valve to be used with much higher shutoff pressures than heretofore possible.

A preferred embodiment of the invention is illustrated in the accompanying drawings in conjunction with a butterfly valve although the invention may equally well be applied to other types of valves. In the drawings:

FIGURE 1 is a plan view of a butterfly valve in closed position embodying the invention;

FIGURE 2 is a fragmentary side view of a portion of the seat liner partially in section and removed from the valve structure;

FIGURE 3 is a fragmentary sectional view through the seat liner taken substantially along line 3—3 in FIGURE 2;

FIGURE 4 is an enlarged fragmentary sectional view through a portion of the valve structure showing the valve disc in closed position against the seat liner and taken substantially along line 4—4 in FIGURE 1;

FIGURE 5 is a fragmentary sectional view similar to FIGURE 4 taken substantially along line 5—5 in FIGURE 1;

FIGURE 6 is a fragmentary plan view of a portion of the reinforcing for the valve seat liner removed from the liner; and FIGURE 7 is a fragmentary sectional view through the reinforcing taken substantially along line 7—7 in FIGURE 6.

The invention, concerned with a reinforced valve seat liner made of rubber or other resilient material, is illustrated in the drawings in connection with a butterfly type of valve. Butterfly valves are made in various sizes from relatively small valves for use in water pipelines to extremely large sizes such as might be used in penstocks or air tunnel applications. The shape of such valves includes round, oval, obround and others.

A typical butterfly valve is illustrated in FIGURE 1 and includes a valve casing 8 which is generally formed with a flange 9 at either side drilled with a plurality of bolt openings 10 for mounting the valve to the flanges of adjacent pipes or other fittings. The casing or housing of the valve may be of cast construction or, in the much larger sizes, may be fabricated of metal plates shaped for the purpose. A valve disc 11 is shown in closed position within the casing. The disc has an edge 12, shown as spaced from the inner surface 13 of the casing, the intervening space being an edgewise face of the seat liner. The valve disc 11 may also be of cast or prefabricated construction according to the size of the valve. Ordinarily, the disc is of dished construction and mounted upon a valve shaft 14 (FIGURE 5) which extends through the valve casing and upwardly into a bonnet 15 so that a valve operator 16 may be attached to the shaft for opening and closing the disc relative to the casing. In the present instance, the operator consists of a gear reduction unit provided with a handwheel 17 for turning the disc manually. Adjustable stop bolts 18 in the bonnet cooperate with an internal lug to limit the movement of the disc to 90° between its fully open and fully closed positions.

The seat liner for the present valve is formed of rubber, its particular shape being ascertained from FIGURES 2 and 3. The liner generally indicated 20 has an inner generally cylindrical surface 21 as installed in the valve casing for sealing engagement with the edge 12 of the valve disc. The opposite side 22 of the liner is generally also cylindrical in shape as installed in the valve body. It may rest against the valve casing and be bonded to the metal of the casing. The peripheral portions of the liner are each formed with a groove 23 and a flange portion 24 at the outer edge of the liner forming the outer side of the groove. It will be noted that the surface of the liner material in cross section (FIGURE 3) slopes downwardly to the bottom of the groove 23 with the flange 24 spaced from the sloping edge. These grooves 23 provide a means for securing and retaining the valve liner in the valve casing.

The particular problem of distortion of the valve seat upon valve shutoff may be best illustrated by reference to FIGURE 4. The valve is shown in closed position; that is, the disc 11 is bearing with its edge portion 12 against the rubber valve seat material so as to seal against the passage of fluid between the disc and seat. It will be noted that the valve seat 20 is held in place by a plurality of shaped keeper plates 25 having a flat portion 26 for bearing against the valve casing and an inner lip 27 fitting into the grooves 23 of the liner. Screws 28 secure the keeper plates to the valve housing so that the lips secure and retain the valve seat in proper position in the housing. This construction has been used in prior valves and while the plates are fairly closely fitted end to end around the annulus of the valve housing, fluid pressure could eventually work into the underside of the rubber valve seat. Assuming for purposes of illustration that pressure is applied on the lefthand side of the valve disc as shown in FIGURE 4, any fluid seeping between the seat liner and casing might pass the point opposite the disc and be applied on the low pressure or non-pressure side of the disc, that is, on the righthand side as viewed in FIGURE 4. Since pressure applied to the liner on the non-pressure side of the disc would not be opposed by pressure within the valve casing, often the resilient material was caused to bulge inwardly around the valve disc forming virtually a barrier against turning of the disc to open the valve.

In the present invention, the difficulty mentioned above with regard to pressure being applied beneath the liner is taken care of by the provision of reinforcing in the valve seat material. One particular type of reinforcing that has been found satisfactory comprises a plurality of metal rods 30 imbedded within the seat material adjacent the outer surface 22 in such a manner that the rods extend across the seat. In FIGURE 2, it will be noted that the rods 30 are generally parallel and evenly spaced although this criterion is not rigidly enforced in the manufacture of the seats. In order to place the rods in the seat material, it is preferred to lace the rods together by small wire lacing 31 which serves to hold the rods generally parallel and evenly spaced during the forming of the seat. The seat material is generally formed flat and molded in that form with the rods in the raw rubber material making up the seat. After the molding procedure, the seat is then easily formed to the cylindrical shape of the valve casing since the lacing 31 on the rods is not sufficiently stiff to prevent the shaping of the reinforcing. The ends of the previously straight piece of liner are brought together and vulcanized to make a complete ring for placement within the valve casing.

The operation of the reinforcing is quite different from most metal reinforcing used with rubber products. None of the rods are subjected to tension forces nor are they operating in ring tension when functioning in a valve. Each rod, in effect, is a separate beam resistant to bending and resisting the pressures between the seat and valve casing by its resistance to bending. It will be noted in FIGURE 4 that the rod 30 has its end portions extending into the peripheral portions of the seat material and beneath the grooves 23 so that the lips 27 on the keeper plates may bear downwardly on the thin section of the seat material effectively holding the ends of the rods in position. Thus, each rod 30 may act as a beam secured at its ends. While I have illustrated the reinforcing in the form of individual rods 30, it is contemplated that the metal may be placed in the seat material in other forms so long as it extends across the seat material and into the peripheral sections so that its ends may in effect be secured in position within the casing against appreciable movement.

Since the seat material is a continuous annulus, provision is made for the passage of the valve shaft 14 through the seat material. As particularly illustrated in FIGURE 5, the rods 32 on either side of the valve shaft 14 are severed so that their inner ends fall short of contacting the valve shaft. This is done by simply blanking an opening in the reinforcing material for the valve shaft prior to its being molded into the rubber material of the seat liner. Ordinarily the opening blanked in the reinforcing is ¼" to ½" larger than the shaft size to insure that the rods do not contact the shaft. The severed rods 32 thus act as cantilevered beams with similar function as the end supported rods 30. The rubber seat material around the shaft opening is generally punched ⅛" smaller than the shaft diameter in order that it may contact and seal against the shaft.

The valves are formed with provision for controlling the valve shaft 14 so that it will rotate upon its own axis and hold the disc against any lateral movement. Thus, as illustrated in FIGURE 5, the lower end of the shaft 14 is surrounded by an oilite bearing 35 and a covering plate 36 supports a thrust bearing 37 on the lower end of the shaft as well as sealing the housing portion around the shaft. The upper end of the shaft is similarly provided with bearing structure as well as a packing gland.

The reinforcing structure for the rubber valve seat may be made in various sizes for various sized valves. It is contemplated that the rod length as well as the rod diameter will be varied to meet the requirements of different sizes of valves. The structure is equally applicable to water or air applications as well as other hydraulic and pneumatic applications. It has been found that the reinforcing acting as a beam effectively prevents the inward bulging of the resilient seat material so that the valve remains operative at all times.

The foregoing detailed description has been given for clearness of understanding only, and no unnecessary limitations should be understood therefrom, for some modifications will be obvious to those skilled in the art.

I claim:

1. A valve seat liner for a valve having a casing and a valve closure, comprising: a ring of resilient material extending about the interior of the valve casing; keeper members arranged on each side of the ring securing and pressing the ring to the valve casing, said ring having a portion intermediate said keeper members forming an inner surface for sealing engagement with the valve closure; and metal reinforcing embedded in said resilient material and extending longitudinally across the ring with spaced portions pressed between the keepers and valve casing, said reinforcing being capable of substantially resisting bending due to a fluid pressure differential acting inwardly of a value up to a predetermined maximum fluid pressure to which the inner surface may be subjected in assembly in said valve casing.

2. A valve seat liner as specified in claim 1 wherein the reinforcing comprises individual metal rods side by side and molded in the seat liner material.

3. A valve seat for a butterfly valve having a casing carrying a valve disc, comprising an annulus of resilient material extending around the interior of the casing and having an inner exposed surface to seal against the valve disc in closed position; keeper members overlying the peripheral portions of the annulus and secured to the valve casing for securing and retaining the resilient seat material in position within the valve casing; and metal reinforcing embedded in the resilient material and extending longitudinally across the annulus below said exposed surface, said reinforcing having its end portions held between said keeper member and casing with the remainder thereof being capable of substantially resisting bending due to a fluid pressure differential acting inwardly of a value up to the predetermined maximum fluid pressure to which the inner surface may be subjected in assembly in said valve casing.

4. A valve seat as specified in claim 3 wherein said reinforcing comprises a plurality of rods molded in the resilient seat material, said rods being generally parallel and extending across the seat with their ends passing between the keeper members and the valve casing to hold the ends of the rods against movement.

5. A valve seat as specified in claim 3 wherein the annulus of resilient material has a relatively thick central section providing said surface for sealing against the valve disc and a pair of annular thinner sections having grooves, one on each side of the central section, for receiving said keeper members, said reinforcing extending under said central section and outwardly past said grooves to bridge the otherwise unsupported central section.

6. A valve seat liner to be secured in a valve casing, comprising: a ring of resilient material having an inner valve seating surface and an external surface; an annular peripheral portion on each side of said ring for use in securing the ring; and metal reinforcing extending as a beam longitudinally across the ring and into said peripheral portions, said metal reinforcing being capable of substantially resisting bending due to a fluid pressure differential acting inwardly of a value up to the predetermined maximum fluid pressure to which the inner surface may be subjected.

7. A valve seat liner to be secured in a valve casing, comprising: an annular ring of resilient material having a generally cylindrical outer surface and a central inner valve seating surface; a peripheral annular portion on each side of said ring for use in securing the liner; and stiff metal reinforcing extending laterally across the ring and into the peripheral portions adjacent said outer surface, said reinforcing being capable of substantially resisting bending due to a fluid pressure differential acting inwardly of a value up to the predetermined maximum fluid pressure to which the inner surface may be subjected.

8. A valve seat liner as specified in claim 7 wherein said reinforcing comprises individual metal rods each acting as a beam secured at its ends when the liner is in position secured in a valve casing.

9. A valve seat liner to be secured in a valve casing, comprising: an annular member of resilient material having an inner valve seating surface and an outer surface; an annular peripheral portion on each side of said annular member for use in securing the member; metal reinforcing embedded in said resilient material and extending across the annular member beneath and to either side of said inner valve seating surface, said metal reinforcing being capable of substantially resisting bending due to a fluid pressure differential acting inwardly of a value up to the predetermined maximum fluid pressure to which the inner surface may be subjected.

References Cited in the file of this patent

UNITED STATES PATENTS

| | | |
|---|---|---|
| 1,977,351 | Phillips | Oct. 16, 1934 |
| 2,066,544 | Shaw | Jan. 5, 1937 |
| 2,716,575 | Vickers | Aug. 30, 1955 |

FOREIGN PATENTS

| | | |
|---|---|---|
| 670,327 | Germany | of 1939 |